3,423,278
PROCESS OF MAKING A CROSS-LINKED ION EXCHANGE MEMBRANE

Russell B. Hodgdon, Jr., Hamilton, Edwin J. Aiken, Magnolia, and John F. Enos, Peabody, Mass., assignors to General Electric Company, a corporation of New York
No Drawing. Continuation-in-part of application Ser. No. 297,227, July 24, 1963. This application July 19, 1966, Ser. No. 566,216
U.S. Cl. 161—165  6 Claims
Int. Cl. C08j 1/34

ABSTRACT OF THE DISCLOSURE

An alkali metal alkylene sulfonate and an acrylamide may be reacted to form a linear polymer. The copolymer in either the acid or alkali metal form may be cross-linked while molding into an ion exchange membrane at elevated temperature and pressure. Where the amide is a material such as N-methylacrylamide no other cross-linking material is needed. Aldehydes are an example of a separate cross-linking agent.

---

This application is directed to subject matter originally presented in our commonly assigned, copending application Ser. No. 297,227, filed July 24, 1963, now abandoned, of which this application is a continuation-in-part.

Our invention relates to cross-linked ion exchange resins and to ion exchange membranes prepared therefrom as well as methods of forming such membranes. Specifically, our invention relates to cross-linked ion exchange materials prepared from the copolymerization of alkali metal alkylene sulfonate and one or more amides of acrylic or methacrylic acid. According to one aspect of our invention a supplementary cross-linking agent may be incorporated to achieve an infusible, insoluble structure. According to a preferred aspect of our invention, the amide may itself constitute the cross-linking material when chosen from among the materials conforming to the following formula:

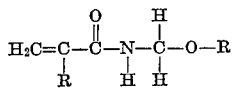

where R is a member selected from the group constsing of hydrogen and an alkyl radical and $R_1$ is a member of the group consisting of hydrogen and methyl.

Further, our invention relates to a process of making a homogeneous ion exchange membrane that is uniformly sulfonated throughout prior to cross-linking and to the products produced by such process.

Interpolymers of the amides of acrylic acid and vinyl aromatic sulfonates are known. These resins have been used as cation exchange resins. However, in these resins the sulfonic acid group is introduced into an aryl nucleus and the sulfonation takes place after polymerization. Further, ion exchange membranes have been formed from copolymers of unsaturated sulfonic acids and polyunsaturated compounds. Copolymers of acrylic acid and a monoethylene compound also have been cross-linked.

None of the known resins, whether formed from a two- or three-component system, have exhibited the physical and electrical properties that are vital to the successful continuous operation of an ion exchange membrane. These desirable characteristics are in part obtainable by the use of previously untried monomeric components and in part to the process of making the ion exchange membranes. Further, none of the prior art methods of forming ion exchange members disclose the cross-linking of a previously sulfonated monomer to form a homogeneous membrane having highly unexpected physical and electrical properties.

We have discovered that we may form structurally strong homogeneous membranes which are more than 10 mils in two dimensions, at least 5 mils thick and are free from cracks and fractures. We have further discovered that the membranes have high tensile strength and elongation, high conductivity as well as the properties of good resistance to gas permeability, thermal degradation and resistance to high amperage burn-out. We provide a membrane that is uniformly sulfonated throughout prior to cross-linking. The membrane is formed in one step from copolymers which have not been previously known or used.

The ion exchange materials are formed by polymerizing an alkali metal alkylene sulfonate and at least one amide of acrylic or methacrylic acid. These materials may be copolymerized in a mole ratio of from 1: to 2:1. According to a preferred form of our invention an amide may be chosen from among the materials conforming to the following formula:

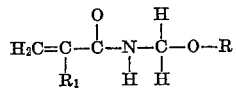

where R is a member selected from the group consisting of hydrogen and an alkyl radical and $R_1$ is a member of the group consisting of hydrogen and methyl. When such amides are employed, cross-linking is accomplished simultaneously with copolymerization. Further, it is not necessary to attempt subsequent sulfonation as is conventionally required, since the monomeric material is initially sulfonated. Accordingly, the problems of obtaining complete and uniform sulfonation of a polymeric material heretofore encountered in the art are completely obviated.

While preferred, it is not necessary that an amide of acrylic or methacrylic acid conforming to the above structural formula be employed. It is apparent that amides such as acrylamide and methacrylamide may be readily used as starting materials and preliminarily converted to compounds conforming to the above structural formula merely by reaction with an aldehyde or a trimer thereof. Alternately, an amide of acrylic or methacrylic acid may be first reacted with an alkali metal alkylene sulfonate and the resulting copolymer cross-linked by use of a conventional cross-linking agent. For example, an aldehyde or a trimer thereof may be again used as a cross-linking agent.

Whether the cross-linking agent is an amide as structurally identified above, an aldehyde or aldehyde trimer, or some other conventional cross-linking agent, the proportion of cross-linking agent is not critical. Generally, sufficient cross-linking to impart water insolubility may be obtained with as little as one percent cross-linking agent taken on a monomeric mole basis. It is noted that when two moles of the structurally designated amide are incorporated for each mole of alkali metal alkylene sulfonate a maximum cross-linking proportion of 67 percent will be obtained. Where an auxiliary cross-linking agent, such as an aldehyde, is used, up to about fifty percent on a monomeric mole basis of the cross-linking agent may be employed. It is apparent that large amounts of cross-linking agents displace the sulfonated moiety and thereby proportionately diminish ion exchange properties of the resulting materials.

It is considered that various processes for achieving the polymerization of the desired monomeric materials would be readily suggested to those skilled in the art. We have achieved polymerization by dissolving the monomers in water, alcohol, or a water-alcohol mixture and adding salts of peracids, such as potassium or ammonium persulfate, to catalyze the free radical polymerization mechanism. The process of polymerization forms no part of our invention.

After the alkali metal alkylene sulfonate has been incorporated in a polymer, it may be readily converted to corresponding sulfonic acid form by the known principles of ion exchange. According to one technique which we have employed the polymer in the alkali metal form is brought into contact with commercial acid ion exchange beads in an aqueous environment. While it is necessary that the alkylene sulfonate be in the alkali metal form to achieve initial polymerization, such polymer may be readily cross-linked with the alkylene sulfonate moiety in either the salt or acid form.

To prepare ion exchange resin formed for use in ion exchange structures, plasticizers may be added to the composition. Suitable plasticizers comprise glycerol, ethylene glycol, sorbitol, polyethylene glycols of various molecular weights and combinations of such plasticizers.

An ion exchange structure, such as an ion exchange membrane, may be readily formed from the cross-linked ion exchange resin by charging the material to a mold and pressing at above approximately 700 p.s.i. and in a temperature range of from 120 to 150° C. Pressing times are not critical, preferably ranging from 5 to 40 minutes. Maximum molding press is not critical and may range as high as 10,000 or 20,000 p.s.i. According to preferred practice the resin is first dried and ground into particles to allow it to be easily and uniformly spread in the mold.

The membrane formed from the aforementioned copolymers have excellent stress and strain properties and are water insoluble. Their resistivity is quite low, e.g., 4–6 ohm-cm. when measured at high relative humidities. The membranes formed from these copolymers also have good resistance to both high amperage burn-out and temperature degradation up to 150° C.

In order that those skilled in the art may better understand how the present invention may be practiced the following examples are given by way of illustration and not by way of limitation.

Example 1

Thirty grams of recrystallized sodium vinyl sulfonate, 3.5 grams of acrylamide and 4.7 grams of N-methylol acrylamide were combined with 250 ml. of distilled water in a 500 ml. 3-neck flask equipped with a mechanical stirrer, nitrogen inlet tube and a thermometer. With slow stirring, the reactants were flushed for 10 minutes with nitrogen previously scrubbed with concentrated sulfuric acid and the nitrogen bubbling rate established at one bubble per second. As quickly as possible a 5 ml. water solution containing 0.3 grams of ammonium persulfate was added through the thermometer port which was loosely fitted to allow the escape of nitrogen from the reaction vessel. This was immediately followed by a fast addition of 0.15 gram of potassium hydrogen sulfite in 5 ml. of water.

The reaction was stirred at room temperature for a period of six hours with only a 3 to 5° rise in temperature being noted. After two hours the solution became very viscous and stirring became difficult at the six-hour level. The reaction was allowed to sit overnight under continuous $N_2$ purge and the viscous, colorless solution was worked up as follows:

To the terpolymer salt was added 200 cc. of methyl alcohol yielding a white precipitate which was broken up and filtered. The solids were redissolved in 1000 ml. of distilled water and passed through a 1000 gram wet bed of Amberlite IR 120 (a trademark for the sulfonated copolymer of styrene and divinyl benzene, note Condensed Chemical Dictionary, page 56, 5th ed., Rheinhold Publishing Company, published 1956) ion exchange beads in order to change the terpolymer into its acid form. The solution was filtered and the filtrate dried in a vacuum oven at 50° C. for seven days. A light yellow residue was obtained which was pulverized by mortar and pestle in a dry box. The following yield was obtained:

Yield=12.4 grams
Sulfur=20.6%
Nitrogen=4.1%
Sodium=Negligible upon ashing a small sample
pH of a molal solution=0.5

Example 2

A water insoluble cross-linked ion exchange membrane was formed from the terpolymer prepared as above.

Six grams of the powdered terpolymer were charged into a cavity gold-plated mold, an atomizer was used to wet the particles and then the mold was closed and subjected to a pressure of 1000 p.s.i. at 135° C. for 20–30 minutes. A cross-linked terpolymer was obtained which was insoluble in water and possessed no softening point up to charring. Its ohmic resistivity at 100% relative humidity was very low at 6 ohm-cm. (1 kc. resistance bridge).

Example 3

Using the same equipment and procedures as in Example 1, a solution comprising 200 ml. of water, 14 grams of sodium vinyl sulfonate, 5 grams of N-methylol acrylamide, and 4 grams of acrylamide was prepared and treated with purified nitrogen and potassium hydrogen sulfite. The resin formed was precipitated with methyl alcohol and then dried. An analysis of the polymer showed the following:

Yield=6.2 grams
Sulfur=14%
Nitrogen=8.4%
Sodium=Negligible upon ashing
pH of a molal solution=1.0

Example 4

A copolymer comprising 30 grams of sodium vinyl sulfonate, and 7 grams of acrylamide was prepared using the same procedure and equipment as in Example 1. An analysis of this resin showed the following:

Yield=20.6 grams
Sulfur=21.8%
Nitrogen=4.6%
Sodium=Negligible upon ashing
pH of a molal solution=0.5

Example 5

A mixture of 0.2 gram of paraformaldehyde and 4 drops of formalin solution was added to 5 grams of the copolymer prepared by Example 4. The mixture was charged into a mold and was subjected to a pressure of 1000 p.s.i. at 135° C. for 20–30 minutes. The membrane wafer formed was water insoluble and infusible up to charring. The ohmic resistance of the membrane was 5 ohm-cm.

Example 6

Using the equipment previously described, 10 grams of sodium vinyl sulfonate and 5 grams of N-methylol acrylamide together with 300 ml. of ethanol and distilled water in 1 to 1 volume ratio were mixed. To this was added 10 ml. of water containing 0.2 gram of potassium persulfate and 0.1 gram of $KHSO_3$. The mixture was stirred at room temperature overnight. The opaque reactants were transferred to a rotary evaporator and the ethanol-water solution evaporated. A light pink gum was obtained. This was dissolved in water and then precipitated by adding methanol in an amount ten times that of the water. The gum was converted partially to the acid form by dissolving in 250 ml. of water and ion exchanging with Dowex 50 acid type ion exchange beads. The water was removed from the material in a 105° C. oven, and the resultant material charged to a molding press. A sheet 2 in. by 2 in. by 10 mils was obtained by molding at 125 to 150° C. using high pressure. The wafer recovered was found to be water insoluble, alcohol insoluble, and alcohol-water insoluble. A portion of the wafer was broken off and tested for fusibility on a Fisher-Jones melting point block. It failed to melt at temperatures up to 217° C. at which point carbonization occurred.

Example 7

Twenty grams of a copolymer formed of sodium vinyl sulfonate and acrylamide in a molar proportion of two to one was dissolved in 500 ml. of distilled water. Enough wet Amberlite IR120 cross-linked acid ion exchange resin beads were added to double the volume displacement. The mixture was stirred for 1 hour and filtered from the beads. The procedure was then repeated twice to insure total conversion to the acid form. After evaporation of the solvent, 6 grams of the finely divided acid polymer was mixed with 1 gram of an equi-part sorbitol-glycerol mixture was added to 0.3 gram of trioxymethylene. The mix was added to the surface of a 2 in. by 2 in. mold having a 30 mil spacing shim. Two-tenths gram of water was atomized onto the surface of the mixture in the mold. The material was heated to 105° C. for 5 minutes and subjected to a molding pressure of 8000 p.s.i. The molding temperature was then raised to 135° C. for a period of 10 minutes.

The resulting ion exchange membrane exhibited a tensile strength of 1800 p.s.i., an elongation before rupture of 25 percent, an ion exchange capacity of 4.90, and a resistivity of 4.1 ohm-cm. The sheet appeared homogeneous and opaque. It was noted to be water insoluble.

While the above description discloses the preferred and practical embodiments of our ion exchange resin and methods of preparing ion exchange membranes therefrom it will be understood by those skilled in the art that details are by way of illustration and are not to be construed as limiting the scope of the invention.

What we claim as new and desire to secure by Letters Patent of the United States is:

1. A process for making a cross-linked ion exchange membrane having at least two dimensions in excess of 10 mils which comprises charging into a mold a polymer prepared from monomers consisting essentially of an sodium vinyl sulfonate and at least one amide of an acid selected from the group consisting of acrylic acid and methacrylic acid, said amide being present in the relative molar proportions of from 1:2 and 2:1, and at least one said amide, present in an amount sufficient to impart water insolubility, exhibiting the structural formula:

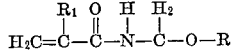

where R is a member selected from the group consisting of hydrogen and an alkyl radical and $R_1$ is a member of the group consisting of hydrogen and methyl and heating the polymer in the temperature range of from 120° to 150° C. at a pressure in excess of 700 p.s.i. to form a homogeneous cross-linked membrane.

2. The product of claim 1.

3. A process of making a cross-linked ion exchange membrane having at least two dimensions in excess of 10 mils which comprises charging into a mold a polymer prepared from monomers consisting essentially of sodium vinyl sulfonate and at least one amide of an acid selected from the group consisting of acrylic acid and methacrylic acid, said amide being present in the relative molar proportions of from 1:2 and 2:1, mixed with a cross-linking agent selected from the class consisting of formaldehyde and formaldehyde trimer in an amount sufficient to impart water insolubility, and heating the polymer in the temperature range of from 120° to 150° C. at a pressure in excess of 700 p.s.i. to form a homogenous cross-linked membrane.

4. The product of claim 3.

5. A process for making a cross-linked ion exchange membrane having at least two dimensions in excess of 10 mils which comprises charging into a mold a resin prepared from monomers consisting essentially of by weight:

14–30 grams of sodium vinyl sulfonate,
3.5–5 grams of acrylamide, and
4–4.7 grams of N-methylol acrylamide and heating said mold to a temperature of about 135° C. at a pressure of about 1000 pounds per square inch for a period of time from 20–30 minutes to form a homogeneous cross-linked membrane.

6. A product formed in accordance with claim 5.

References Cited

UNITED STATES PATENTS

| 2,527,300 | 10/1950 | Dudley | 210—24 |
| 2,702,272 | 2/1955 | Kasper | 204—151 |
| 3,037,963 | 6/1962 | Christenson | 260—72 |
| 3,079,434 | 2/1963 | Christenson et al. | 260—561 |
| 3,203,938 | 8/1965 | Baechtold | 260—79.3 |

WILLIAM H. SHORT, Primary Examiner.

M. GOLDSTEIN, Assistant Examiner.

U.S. Cl. X.R.

260—2.2, 79.3; 204—296; 264—239